United States Patent
Ward et al.

(10) Patent No.: US 10,831,489 B2
(45) Date of Patent: Nov. 10, 2020

(54) MECHANISM FOR COMPLETING ATOMIC INSTRUCTIONS IN A MICROPROCESSOR

(71) Applicant: International Business Machines Corporation, Armonk, NY (US)

(72) Inventors: Kenneth L. Ward, Austin, TX (US); Susan E. Eisen, Round Rock, TX (US); Dung Q. Nguyen, Austin, TX (US); Glenn O. Kincaid, Austin, TX (US); Joe Lee, Round Rock, TX (US); Deepak K. Singh, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 90 days.

(21) Appl. No.: 16/110,061

(22) Filed: Aug. 23, 2018

(65) Prior Publication Data

US 2020/0065103 A1    Feb. 27, 2020

(51) Int. Cl.
| | |
|---|---|
| G06F 9/50 | (2006.01) |
| G06F 9/34 | (2018.01) |
| G06F 9/30 | (2018.01) |
| G06F 9/38 | (2018.01) |

(52) U.S. Cl.
CPC ............ *G06F 9/34* (2013.01); *G06F 9/30036* (2013.01); *G06F 9/3836* (2013.01)

(58) Field of Classification Search
None
See application file for complete search history.

(56) References Cited

U.S. PATENT DOCUMENTS

| | | | | |
|---|---|---|---|---|
| 8,176,253 | B2* | 5/2012 | Taillefer | G06F 9/45504 |
| | | | | 703/24 |
| 8,688,617 | B2 | 4/2014 | Morgan et al. | |
| 10,235,292 | B2* | 3/2019 | Hakimi | G06F 12/084 |
| 2007/0169179 | A1* | 7/2007 | Narad | H04L 45/16 |
| | | | | 726/4 |
| 2009/0006751 | A1* | 1/2009 | Taillefer | G06F 9/45504 |
| | | | | 711/121 |
| 2010/0083269 | A1* | 4/2010 | Moody | G06F 9/526 |
| | | | | 718/104 |
| 2011/0055483 | A1* | 3/2011 | Heller, Jr. | G06F 9/466 |
| | | | | 711/125 |
| 2014/0237323 | A1 | 8/2014 | Yu et al. | |
| 2016/0011996 | A1 | 1/2016 | Asaad et al. | |
| 2016/0241475 | A1* | 8/2016 | Wang | H04L 45/7453 |
| 2016/0323358 | A1 | 11/2016 | Malhotra et al. | |
| 2019/0187993 | A1* | 6/2019 | Ward | G06F 9/3851 |
| 2020/0026521 | A1* | 1/2020 | Ward | G06F 9/3861 |

* cited by examiner

*Primary Examiner* — Hyun Nam
(74) *Attorney, Agent, or Firm* — Patterson + Sheridan, LLP (57) ABSTRACT

Method and apparatus for completing atomic instructions in a microprocessor may be provided by identifying from a program-ordered Instruction Completion Table (ICT) a last entry in a completion window of instructions for completion in a current clock cycle of a processor; in response to determining that the last entry includes an atomic instruction that straddles the completion window: excluding the last entry from completion during the current clock cycle; completing instructions in the completion window for the current clock cycle; and shifting the completion window to include the last entry and a next entry adjacent to the last entry in the ICT in a next clock cycle.

20 Claims, 4 Drawing Sheets

MECHANISM FOR COMPLETING ATOMIC INSTRUCTIONS IN A MICROPROCESSOR

BACKGROUND

The disclosure relates to processors, and more specifically, to improvements in the functionality thereof in the handling of atomic instructions. Atomic instructions are instructions that a processor handles as an indivisible unit to be completed at the same time. Some atomic instructions may include several sub-instructions that the processor is directed to complete as one atomic instruction.

SUMMARY

According to one embodiment of the present invention, a method for completing atomic instructions is provided, the method comprising: identifying from a program-ordered Instruction Completion Table (ICT) a last entry in a completion window of instructions for completion in a current clock cycle of a processor; in response to determining that the last entry includes an atomic instruction that straddles the completion window: excluding the last entry from completion during the current clock cycle; completing instructions in the completion window for the current clock cycle; and shifting the completion window to include the last entry and a next entry adjacent to the last entry in the ICT in a next clock cycle.

According to another embodiment of the present invention, a system for completing atomic instruction is provided, the system comprising: system, comprising: a computational unit; an Instruction Completion Table (ICT), including a plurality of entries, each entry of the plurality of entries including at least two instructions for processing by the computational unit, wherein the entries are organized in a program order in the ICT; a controller, in communication with the computational unit and the ICT, configured to: identify a last entry in a completion window of the ICT for a current clock cycle; in response to determining that the last entry includes an atomic instruction that straddles the completion window: prevent the computational unit from completing instructions included in the last entry during the current clock cycle; allow the computational unit to complete instructions included in other entries in the completion window during the current clock cycle; and shift the completion window to include the last entry and a next entry adjacent to the last entry in the ICT in a next clock cycle.

According to another embodiment of the present invention, a computer-readable storage medium having computer-readable program code embodied therewith for completing atomic instruction is provided, the computer program product comprising: a computer-readable storage medium having computer-readable program code embodied therewith, the computer-readable program code executable by one or more computer processors to: identify from a program-ordered Instruction Completion Table (ICT) a last entry in a completion window of instructions for completion in a current clock cycle of a processor, wherein each entry in the ICT is associated with more than one instruction; in response to determining that the last entry includes an atomic instruction that straddles the completion window: excluding the last entry from completion during the current clock cycle; completing instructions in the completion window for the current clock cycle; and shifting the completion window to include the last entry and a next entry adjacent to the last entry in the ICT in a next clock cycle.

DETAILED DESCRIPTION

Modern processors may complete multiple instructions per clock cycle. These processors may issue and finish instructions out of order relative to the order specified in a program using those instructions (a program order), and may have many instructions in-process at any given time. To ensure that the instructions complete in program order, despite being handled in a potentially different order by the processor, the instructions are tracked in an Instruction Completion Table (ICT). The Instruction Completion Table (ICT) for a processor may include references for several instructions in the program order for those instructions, and the statuses of those instructions. In some embodiments, a tail pointer is maintained to point to the oldest not finished instruction in the ICT so that the processor may complete all instructions stored in the ICT before (relative to the program order) the pointed-to instruction.

When using a tail pointer that points to the oldest non-finished instruction to complete all instructions earlier in the ICT, the operation of the processor may be disrupted when the instruction pointed to is part of an atomic instruction. Atomic instructions include several sub-instructions, each of which occupies an individual position in the ICT, but that the processor is to complete during the same clock cycle as the other sub-instructions that make up the atomic instruction. If one sub-instruction is noted by the tail pointer to be the non-finished instruction, but an earlier sub-instructions is noted as finished, the processor may attempt to complete the earlier sub-instruction at a different time than the later sub-instruction; violating the atomic nature of the set of sub-instructions.

To improve the functionality of computing devices using instruction sets with atomic instructions, a sliding completion window is used in association with the finished status and atomic status information in a Ready to Complete (RTC) vector associated with an ICT. The atomic status information indicates whether the instruction(s) at a given table entry correspond(s) to an atomic begin or an atomic end. The atomic begin corresponds to the first sub-instruction of a given atomic instruction in the program order and the atomic end corresponds to the last sub-instruction of the given atomic instruction in the program order. The position of the tail pointer may be adjusted according to not only the status of the individual instruction (finished/non-finished), but also according to the atomic identifier for that instruction so that the tail pointer is moved depending on the completion status and atomic nature of the instruction.

As used herein, numbers in bases other than base ten are identified with a subscript identifying the base that should be used to interpret the number. For example, the number 11 will be understood to be a base ten representation of eleven, while $11_2$ will be understood to be a base two representation of three, while $11_{16}$ will be understood to be a base sixteen (hexadecimal) representation of seventeen. Examples given in the present disclosure that refer to an index or a position of a given value in an array or matrix shall begin at 1 (rather than 0), and the teachings provided by the present disclosure may be applied in embodiments using different indexing and/or ordering schemes than used in the examples.

Figure 1:
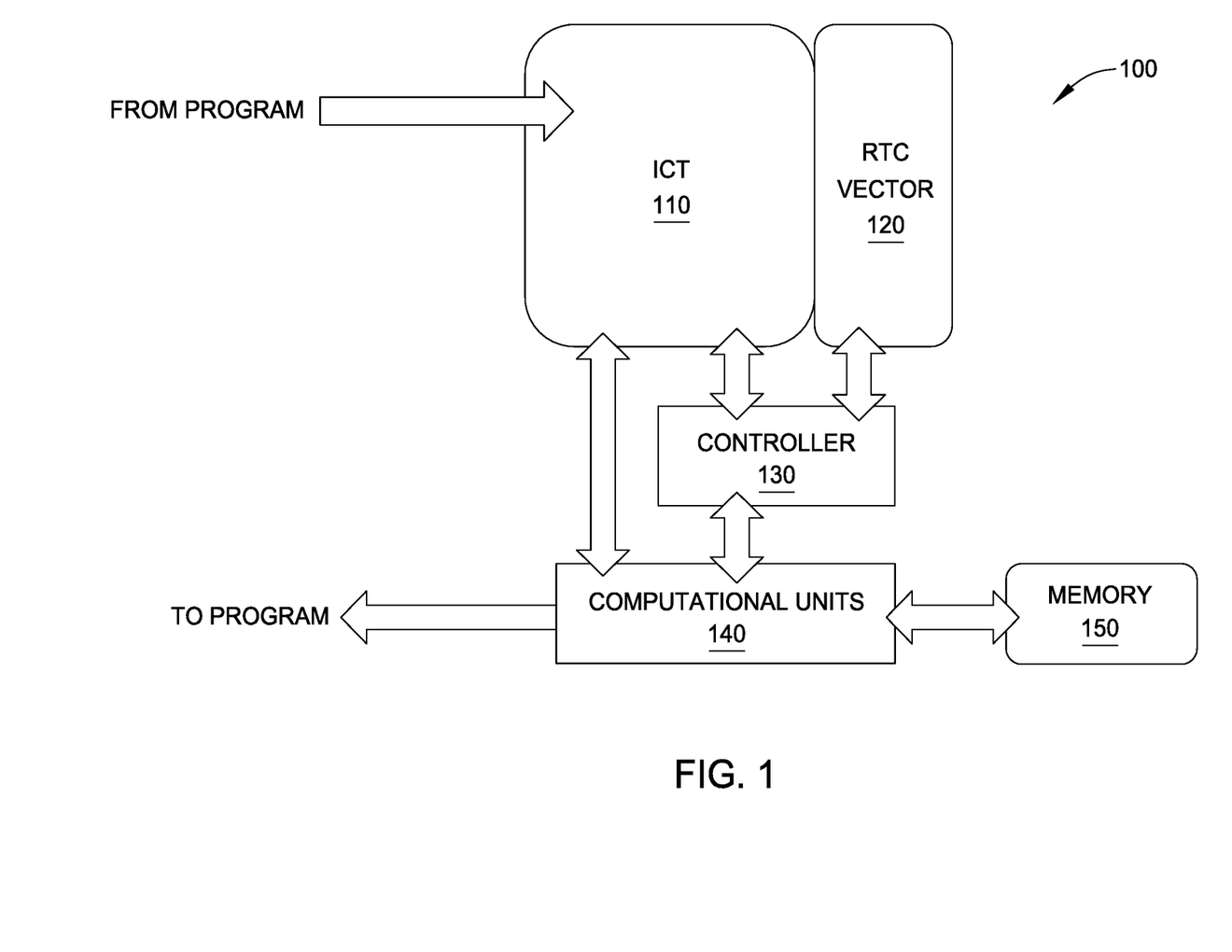
FIG. 1 illustrates a microprocessor unit, according to aspects of the invention.

With reference now to FIG. 1, a microprocessor unit 100 is illustrated, as may be part of a computing device. An instruction completion table (ICT) 110 is organized as a circular list with each entry in the ICT 110 tracking a one or more instructions for the microprocessor unit 100 to track whether those instructions are ready for completion. Once an entry is completed, the instructions in that entry may be flushed so that the ICT 100 may reuse those entries for later instructions. The ICT 110 orders how the instructions are assigned to the entries in program order, although the individual instructions may be handled in any order. The program order specifies that an instruction held in an earlier entry is to be completed before an instruction held in a later entry for the orderly use of a program using the microprocessor unit 100 to perform calculations and hardware commands on behalf of that program.

A Ready to Complete (RTC) vector 120 is associated with the ICT 110 such that each entry in the RTC vector 120 is associated with the statuses of the entries in the ICT 110. The RTC vector 120 provides a controller 130 in communication with the ICT 110 and computational unites 140 in the microprocessor unit 110 with knowledge of the instructions stored in the ICT 110 without needing to query the ICT 110 directly.

The instructions in the ICT 110 are processed by the computational units 140, and may read or write from various memory 150 in the microprocessor unit 100 or external to the microprocessor unit 100, including registers, storage devices, sensors, and other external devices. Once the computational units 140 have finished a given instruction, the controller 130 may update the ICT 110 and/or the RTC vector 120 to reflect that the given entry has instructions that are finished and ready for completion. The controller 130 may then signal the computational units 140 to complete the instructions in the associated entries when the order and status of the entries in the ICT 110 allows for completion in program order.

Figure 2A:
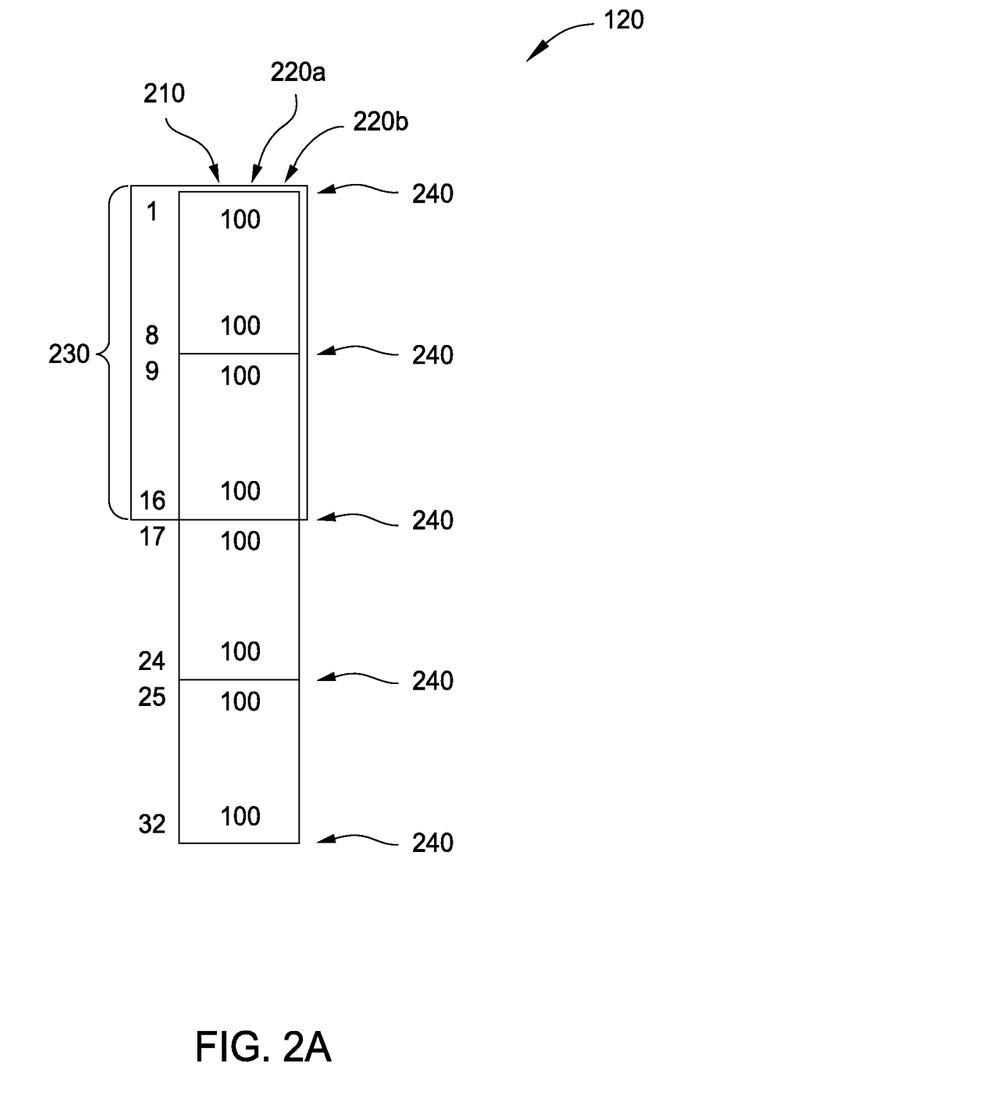
FIGS. 2A and 2B illustrate example Ready to Complete vectors associated with Instruction Completion Tables, according to aspects of the invention.

FIG. 2A, illustrates an example of a Ready to Complete (RTC) vector 120 associated with an Instruction Completion Table (ICT) 110. The RTC vector 120 includes a completion status bit 210 for each entry in the ICT 110, which may be set to $0_2$ or $1_2$ to indicate whether the associated instruction in the ICT 110 is not-ready for completion or finished (i.e., ready for completion) respectively. Additionally, one or more atomic status bits 220 in the RTC vector 120 may be associated with each entry in the ICT 110 to identify when the given entry includes the start or the end of an atomic instruction. For example, a first atomic status bit 220a may indicate that the associated entry includes the beginning of an atomic instruction when set to $1_2$, and a second atomic status bit 220b may indicate that the associated entry includes the end of an atomic instruction when set to $1_2$. In another example, a single atomic status bit 220 may be used to track whether the associated entry includes an atomic begin instruction.

For clarity in the figures, the status bits (completion status bits 210 and atomic status bits 220) for some of the entries are omitted from illustrated views, but each entry in the RTC vector 120 is associated with status bits that track the finished/non-finished status and atomic nature of the associated instructions. For purposes of the examples given herein, unless indicated otherwise, the completion status bits 210 for the non-illustrated entries may be assumed to be set to $1_2$ (indicating that the associated instructions are ready for completion) and the atomic status bits 220 for the non-illustrated may be assumed to be set to $0_2$ (indicating that the associated instructions are non-atomic).

In embodiments that include multiple instructions per entry in the ICT 110, the completion status bit 210 for a given entry is set to $0_2$ or $1_2$ when all instructions in that entry are finished, but the atomic status bit(s) 220 is set to $0_2$ or $1_2$ based on at least one instruction in that entry having a particular atomic status (atomic begin or atomic end). For example, when using a first atomic status bit 220a to indicate the presence of an atomic begin, and a second atomic status bit 220b to indicate the presence of an atomic end, the atomic status bits 220 may indicate: $00_2$ when neither instruction is part of an atomic instruction; $01_2$ when at least one instruction is an atomic start; $10_2$ when at least one instruction is an atomic end; and $11_2$ when one instruction is an atomic start and one instruction is an atomic end. As will be appreciated, an atomic status of $11_2$ may indicate that a complete atomic instruction (i.e., the start through the end instructions) is included in one entry, or may indicate that two atomic instructions neighbor each other in the ICT 110 (e.g., the end of a first atomic instruction and the start of a second atomic instruction are included in one entry). The controller 130 may therefore evaluate the atomic status bits 220 to determine whether to examine neighboring entries before determining whether to allow completion of a given entry.

The example RTC vector 120 in FIG. 2A is shown with thirty-two entries, corresponding to an ICT 110 with thirty-two entries, but an ICT 110 may have any number of entries in various embodiments, referred to herein as Z entries, each of which may track one or more instructions. In some embodiments, the computational units 140 may not be practically able to complete all Z entries in an associated ICT 110 in a single clock cycle; therefore the controller 130 may throttle the computational units 140 to complete a subset of the Z entries in a single clock cycle within a completion window 230 of Y entries. Furthermore, various word boundaries 240 of X entries in the ICT 110 may be set to ensure that the computational units 140 complete instructions up to a word boundary 240 in the ICT 110 by aligning the completion window 230 with the word boundaries 240, so that the computational units 140 may start completing entries from one position, but will stop completing entries at a position that is an even multiple of X.

For example, with Z=32, Y=16, and X=8 as in the example RTC vector 120 in FIG. 2A, with a tail pointer initially set to position 1 in the RTC vector 120, the computational units 140 may complete instructions in entries 1 through 16. The computational units 140 may complete these instructions in the present example because the completion window 230 of Y=16 allows for up to 16 entries to be completed in a single clock cycle, each of the entries 1-16 are noted as being finalized in associated completion status bits 210, and position 16 falls at an even multiple of X.

In another example, with Z=32, Y=16, and X=8 as in the example RTC vector 120 in FIG. 2A, with a tail pointer initially set to position 6 in the RTC vector 120, the computational units 140 may complete instructions in entries 6 through 16. The computational units 140 may complete these instructions in the present example because the completion window 230 of Y=16 allows for up to 16 entries to be completed in a single clock cycle, and position 16 falls at an even multiple of X, but position 22 (pointer+Y;

6+16=22) does not fall at an even multiple of X, and is outside of the completion window 230.

Figure 2B:
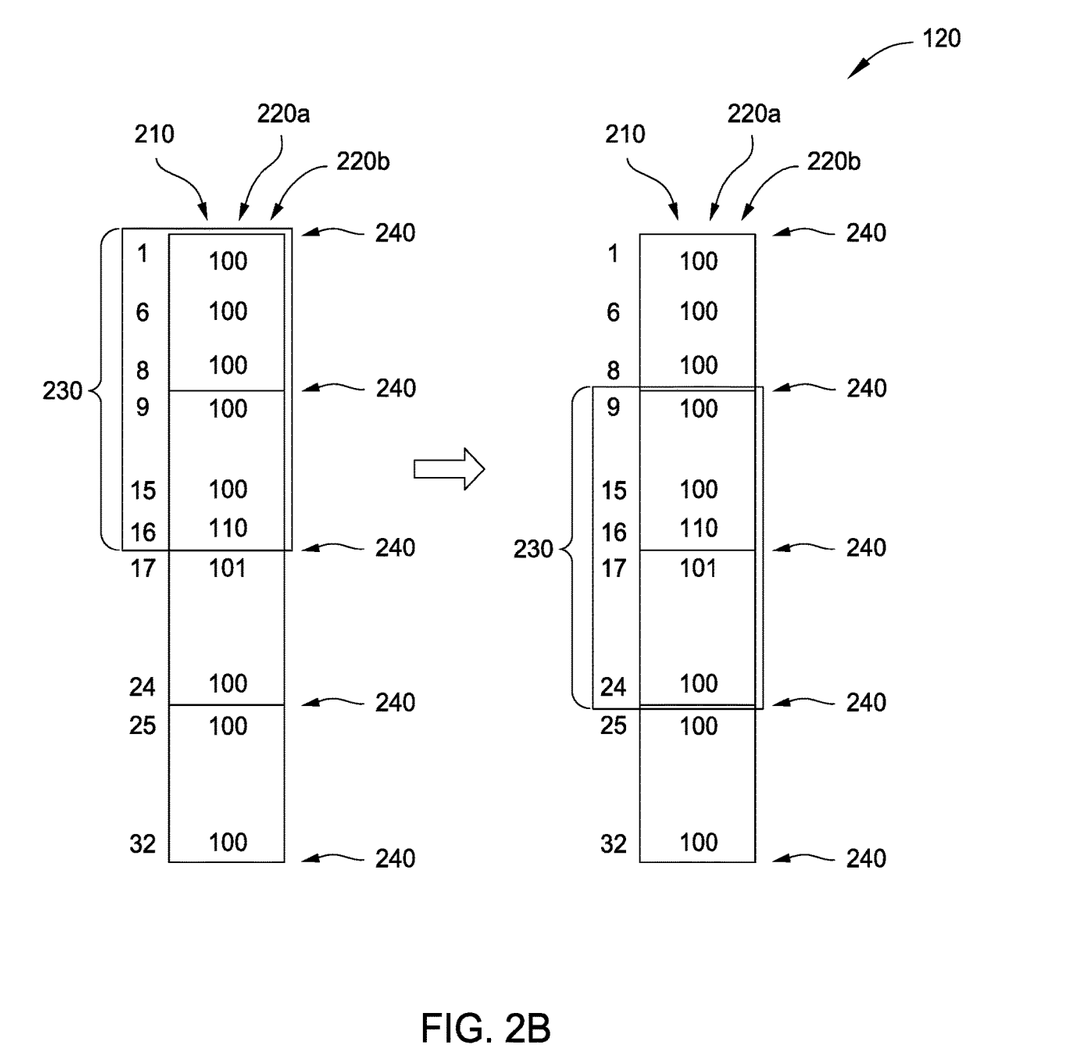

FIG. 2B illustrates a second example RTC vector 120, with an atomic instruction split between entries 16 and 17. In an example, with Z=32, Y=16, and X=8 with reference to the RTC vector 120 in FIG. 2B, with a tail pointer initially set to position 6 in the RTC vector 120, the computational units 140 may initially attempt to complete instructions in entries 6 through 16. Because the entry in position 16 includes an atomic start instruction of an atomic instruction that completes with an atomic end instruction in position 17, the computational units 140 may not complete the instructions in entry 16 without completing the atomic end instruction in position 17; resulting in a deadlock or error if not resolved.

To resolve the potential deadlock/error outlined above, the controller 130 analyzes the completion status bits 210 and the atomic status bits 220 to determine which entries to complete, and slides the completion window 230 to include both of the atomic instructions for consideration for completion in a subsequent clock cycle. Because the completion window 230 is set larger than the word boundary 240 (i.e., Y>X), the computational units 140 may complete the finalized instructions up to the atomic instruction (i.e., from the pointer to position 15) in the initial completion window 230, and the controller 130 shifts the completion window 230 to different word boundaries 240 to include both atomic instructions in a single completion window 230 for the subsequent clock cycle. For example, in FIG. 2B, the completion window 230 is originally set to coincide with positions 1 through 16, but is shifted to coincide with positions 8 through 24 for the next clock cycle so that the atomic instructions at positions 16 and 17 may be completed during the same clock cycle as one another. In the first clock cycle, the instructions in entries 6 through 15 are completed, and the second clock cycle, entries 16 up to 24 (or the next non-finished entry at a position between 16 and 24) are completed.

Figure 3:
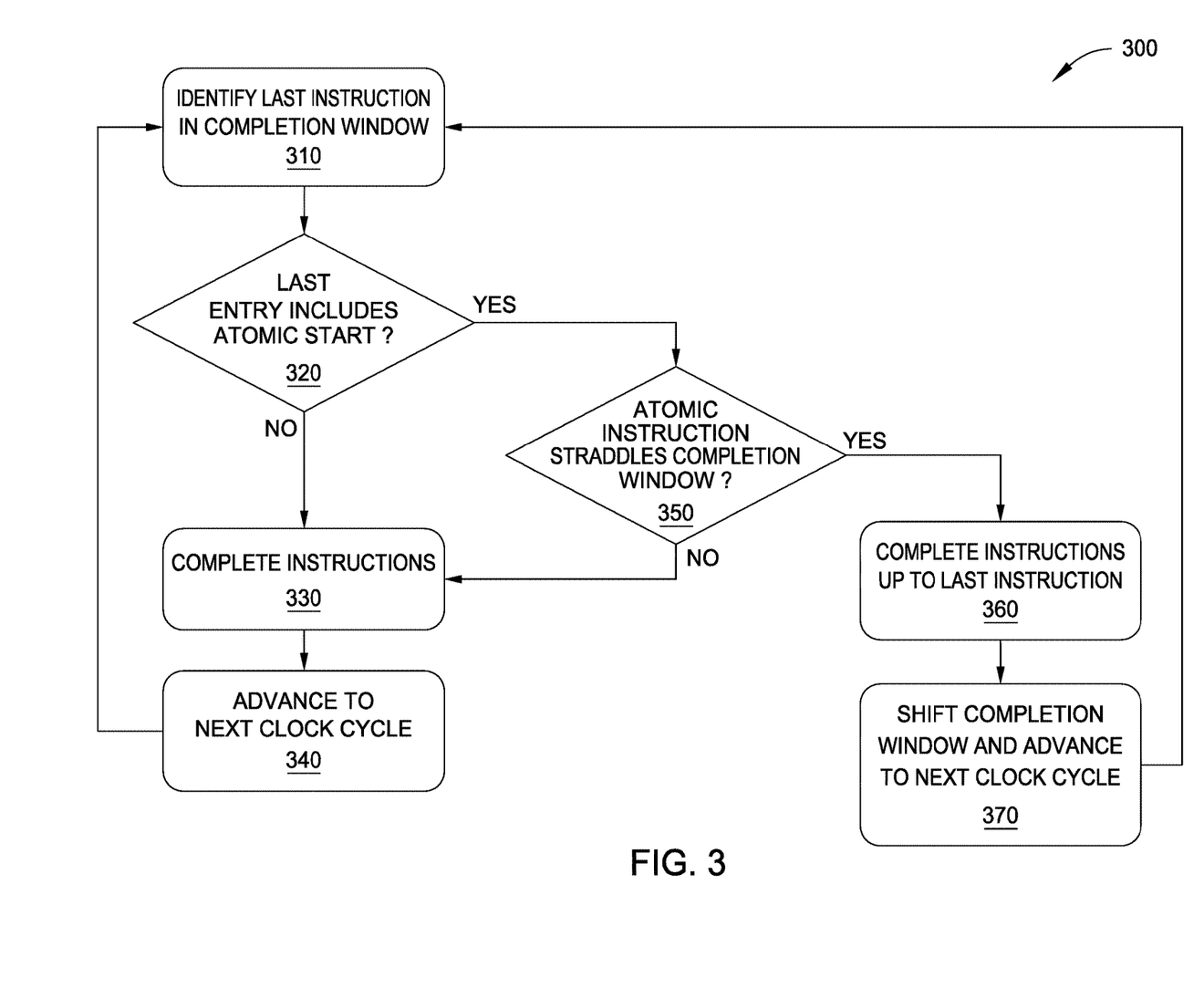
FIG. 3 is a flowchart for an example method for completing atomic instructions in a microprocessor, according to aspects of the invention.

FIG. 3 is a flowchart for an example method 300 for completing atomic instructions in a microprocessor. Method 300 begins with block 310, where a controller 130 identifies a last entry in a completion window 230 for the current clock cycle. The completion window 230 may span from one word boundary 240 to another word boundary 240, and is sized to be larger than a given word boundary 240 (i.e., Y>X).

At block 320, the controller 130 determines whether the last entry in the completion window 230 includes an atomic start instruction. The controller 130 may query one or atomic status bits 220 in an RTC vector 120 to determine whether the corresponding entry in the ICT 110 includes a part of an atomic instruction. For example, a first atomic status bit 220*a* may indicate that the entry includes an atomic start instruction and a second atomic status bit 220*b* may indicate that the entry includes an atomic end instruction. In another example, a single atomic status bit 220 may indicate whether the entry includes an atomic start instruction, and due to the ICT 110 maintaining the instructions in program order, the controller 130 may infer that the next entry includes the atomic end command. If the controller 130 determines that the entry does not include an atomic start instruction, method 300 proceeds to block 330. If the controller 130 determines that the entry includes an atomic start instruction and the ICT 110 tracks multiple instructions per entry, method 300 proceeds to block 350. In embodiments that track one instruction per entry in the ICT 110, block 350 may be omitted from method 300, and method 300 proceeds to block 360 if the controller 130 determines that the last entry includes an atomic start instruction.

At block 330, controller 130 allows the computational units 140 to complete the instructions marked as finished in the ICT 110 in the current completion window 230. In some embodiments, the controller 130 flushes the entries that have been completed and/or allows later received instructions from a program to overwrite the instructions marked as completed.

At block 340, the microprocessor unit 100 advances to the next clock cycle. When all entries in the current completion window 230 are completed, the controller 130 shifts the completion window 230 such that the word boundary 240 where the current completion window 230 ends is the word boundary 240 where the next completion window 230 begins. For example, with a completion window 230 spanning position 1 to position 64 (i.e., Y=64), with word boundaries 240 set at positions of multiples of 32 (i.e., X=32), once entries in positions 1 through 64 have been completed, the completion window 230 shifts to span positions 65 to 128. Method 300 then returns to block 310.

At block 350, the controller 130 determines whether an atomic instruction for which the atomic start instruction (as a sub-instruction) is included in the last entry straddles the current completion window 230. In embodiments that include multiple instructions in a single entry, the controller 130 determines whether the last entry includes the atomic start and the atomic end sub-instructions. For example, a second atomic status bit 220*b* may indicate that the last entry that includes the atomic start instruction (as determined per block 320) may also include the atomic end instruction for the atomic instruction. If the controller 130 determines that the entry does not include an atomic end instruction, method 300 proceeds to block 370. If the controller 130 determines that the entry includes an atomic end instruction, the controller 130 determines whether an entry in the ICT 110 that is adjacent to the last entry in the ICT 110 (which includes the atomic start) includes an atomic instruction to indicate whether the atomic start in the last entry straddles the current completion window 230.

In some embodiments, the adjacent entry that is checked is the next entry in the ICT 100 (which is outside of the completion window 230 but adjacent to the last entry that was determined to include an atomic start). The next entry may be checked, via a second atomic status bit 220*b*, to determine if an atomic end instruction is included in the next entry. In other embodiments, the adjacent entry that is checked is the prior entry in the ICT 110 (which is inside of the completion window 230 and adjacent to the last entry that was determined to include an atomic start). The prior entry may be checked, via a first atomic status bit 220*a*, to infer whether an atomic start instruction is included in the next entry. If the prior entry includes an atomic start, the controller 130 may determine that the last entry includes an atomic end for the atomic start in the prior entry, and an atomic start that has an atomic end included in the next entry (outside of the current completion window 230). If the controller 130 determines that the next entry includes an atomic end, indicating that an atomic start in the last entry straddles the current completion window 230 to end in the next entry, method 300 proceeds to block 360. If the controller 130 determines that the next entry does not include an atomic end, indicating that the last entry in the completion window 230 includes both the atomic start and atomic end for a given atomic instruction, method 300 proceeds to block 330.

At block 360, the controller 130 allows the computational units 140 to complete the instructions marked as finished in the ICT 110 in the current completion window 230 during the current clock cycle except for those included in the last entry. For example, in a completion window 230 of 64 entries (i.e., Y=64) that spans positions 1 through 64, the computational units 140 may complete instructions in entries 1 through 63, but will not complete the instructions in entry 64 in the current clock cycle. The controller 130 may prevent the computational units 140 from completing the last entry by shifting a tail pointer from the last entry to the prior entry (or an even earlier entry without atomic instructions included therein) to signal the computational units 140 where to end instruction completion.

At block 370, the microprocessor unit 100 advances to the next clock cycle. When all entries in the current completion window 230 are completed up to the last entry, the controller 130 may shift the completion window 230 such the next completion window 230 ends at the next word boundary 240 relative to the word boundary 240 where the current completion window 230 ends. For example, with a completion window 230 spanning position 1 to position 64 (i.e., Y=64), with word boundaries 240 set at positions of multiples of 32 (i.e., X=32), once entries in positions 1 through 63 have been completed, the controller 130 shifts the completion window 230 to span positions 33 to 96. In another example, with a completion window 230 spanning position 1 to position 64 (i.e., Y=64), with word boundaries 240 set at positions of multiples of 16 (i.e., X=16), once entries in positions 1 through 63 have been completed, the controller 130 shifts the completion window 230 to span positions 17 to 80. Method 300 then returns to block 310.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for completing atomic instructions in a microprocessor, comprising:
   identifying from a program-ordered Instruction Completion Table (ICT) a last entry in a completion window of instructions for completion in a current clock cycle of a processor;
   in response to determining that the last entry includes an atomic instruction that is included partially in and extends beyond the completion window:
   excluding the last entry from completion during the current clock cycle;
   completing instructions in the completion window for the current clock cycle; and
   shifting the completion window to include the last entry and a next entry adjacent to the last entry in the ICT in a next clock cycle.

2. The method of claim 1, wherein determining that the last entry includes the atomic instruction that is included partially in and extends beyond the completion window further comprises:
   determining whether an atomic status bit in a Ready To Complete (RTC) vector associated with the ICT for the last entry indicates that the last entry includes an atomic start instruction.

3. The method of claim 2, wherein each entry in the ICT is associated with more than one instruction.

4. The method of claim 3, further comprising:
   in response to determining that the last entry includes an atomic end of the atomic instruction, and that the next entry in the ICT adjacent to the last entry includes a second atomic end:
   determining that the atomic instruction is included partially in and extends beyond the completion window.

5. The method of claim 3, further comprising:
   in response to determining that the last entry includes an atomic end of the atomic instruction, and that a prior entry in the ICT adjacent to the last entry includes a second atomic start:
   determining that the atomic instruction is included partially in and extends beyond the completion window.

6. The method of claim 1, wherein shifting the completion window sets an end position of the completion window in the next clock cycle to a next word boundary in the ICT relative to an end position of the completion window in the current clock cycle.

7. The method of claim 1, wherein the completion window is larger than word boundaries in the ICT.

8. The method of claim 1, wherein excluding the last entry from the completion window further comprises:
   moving a tail pointer from the last entry to a prior entry in the ICT.

9. A system, comprising:
   a computational unit;
   an Instruction Completion Table (ICT), including a plurality of entries, each entry of the plurality of entries including at least two instructions for processing by the computational unit, wherein the entries are organized in a program order in the ICT;
   a controller, in communication with the computational unit and the ICT, configured to:
   identify a last entry in a completion window of the ICT for a current clock cycle;
   in response to determining that the last entry includes an atomic instruction that is included partially in and extends beyond the the completion window:

prevent the computational unit from completing instructions included in the last entry during the current clock cycle;

allow the computational unit to complete instructions included in other entries in the completion window during the current clock cycle; and shift the completion window to include the last entry and a next entry adjacent to the last entry in the ICT in a next clock cycle.

10. The system of claim 9, wherein determining whether the last entry includes the atomic instruction that is included partially in and extends beyond the completion window comprises:

in response to determining that a first atomic status bit in a Ready To Complete (RTC) vector associated with the ICT for the last entry indicates that the last entry includes an atomic start instruction; and in response to determining that a second atomic status bit in the Ready To Complete (RTC) vector associated with the ICT for the next entry indicates that the next entry includes an includes an atomic end instruction:

determining that the atomic instruction is included partially in and extends beyond the completion window.

11. The system of claim 9, wherein determining whether the last entry includes the atomic instruction that is included partially in and extends beyond the completion window comprises:

in response to determining that a first atomic status bit in a Ready To Complete (RTC) vector associated with the ICT for the last entry indicates that the last entry includes an atomic start instruction;

in response to determining that a second atomic status bit in the Ready To Complete (RTC) vector associated with the ICT for the last entry indicates that the last entry includes an atomic end instruction; and in response to determining that a third atomic status bit in the Ready To Complete (RTC) vector associated with the ICT for the next entry indicates that the next entry includes an includes a second atomic start instruction:

determining that the atomic instruction is included partially in and extends beyond the completion window.

12. The system of claim 9, wherein shifting the completion window sets an end position of the completion window in the next clock cycle to a next word boundary in the ICT relative to an end position of the completion window in the current clock cycle.

13. The system of claim 9, wherein the completion window is larger than word boundaries in the ICT.

14. The system of claim 9, wherein preventing the computational unit from completing the instructions included in the last entry further comprises:

moving a tail pointer from the last entry to a prior entry in the ICT.

15. A non-transitory computer program product for completing atomic instructions in a microprocessor, the computer program product comprising:

a computer-readable storage medium having computer-readable program code embodied therewith, the computer-readable program code executable by one or more computer processors to:

identify from a program-ordered Instruction Completion Table (ICT) a last entry in a completion window of instructions for completion in a current clock cycle of a processor, wherein each entry in the ICT is associated with more than one instruction;

in response to determining that the last entry includes an atomic instruction that is included partially in and extends beyond the completion window:

excluding the last entry from completion during the current clock cycle;

completing instructions in the completion window for the current clock cycle; and shifting the completion window to include the last entry and a next entry adjacent to the last entry in the ICT in a next clock cycle.

16. The computer program product of claim 15, wherein determining whether the last entry includes the atomic instruction that is included partially in and extends beyond the completion window comprises:

in response to determining that a first atomic status bit in a Ready To Complete (RTC) vector associated with the ICT for the last entry indicates that the last entry includes an atomic start instruction; and in response to determining that a second atomic status bit in the Ready To Complete (RTC) vector associated with the ICT for the next entry indicates that the next entry includes an includes an atomic end instruction:

determining that the atomic instruction is included partially in and extends beyond the completion window.

17. The computer program product of claim 15, wherein determining whether the last entry includes the atomic instruction that is included partially in and extends beyond the completion window comprises:

in response to determining that a first atomic status bit in a Ready To Complete (RTC) vector associated with the ICT for the last entry indicates that the last entry includes an atomic start instruction;

in response to determining that a second atomic status bit in the Ready To Complete (RTC) vector associated with the ICT for the last entry indicates that the last entry includes an atomic end instruction; and in response to determining that a third atomic status bit in the Ready To Complete (RTC) vector associated with the ICT for the next entry indicates that the next entry includes an includes a second atomic start instruction:

determining that the atomic instruction is included partially in and extends beyond the completion window.

18. The computer program product of claim 15, wherein shifting the completion window sets an end position of the completion window in the next clock cycle to a next word boundary in the ICT relative to an end position of the completion window in the current clock cycle.

19. The computer program product of claim 15, wherein the completion window is larger than word boundaries in the ICT.

20. The computer program product of claim 15, wherein excluding the last entry from completion during the current clock cycle further comprises:

moving a tail pointer from the last entry to a prior entry in the ICT.

* * * * *